April 18, 1961  W. K. ROBBINS  2,979,886
CHAIN LINK HAVING TWO-PIECE SPACING STUD
Filed Jan. 27, 1958
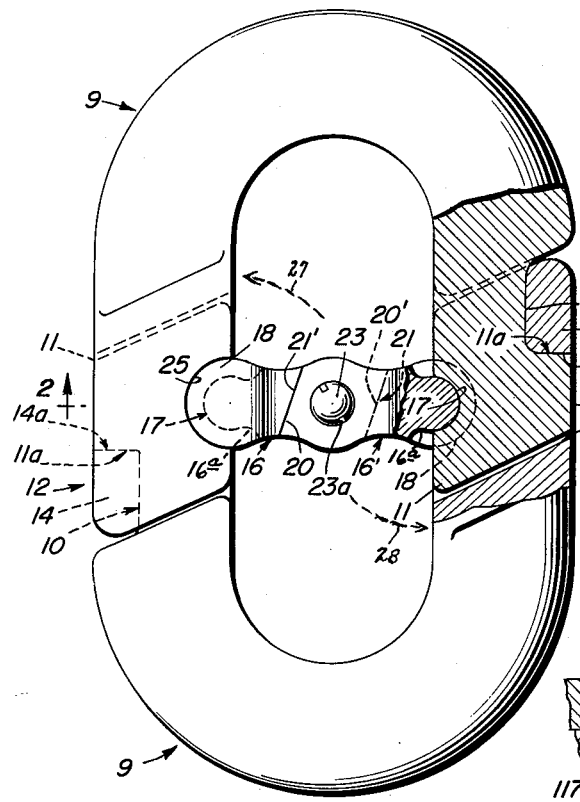
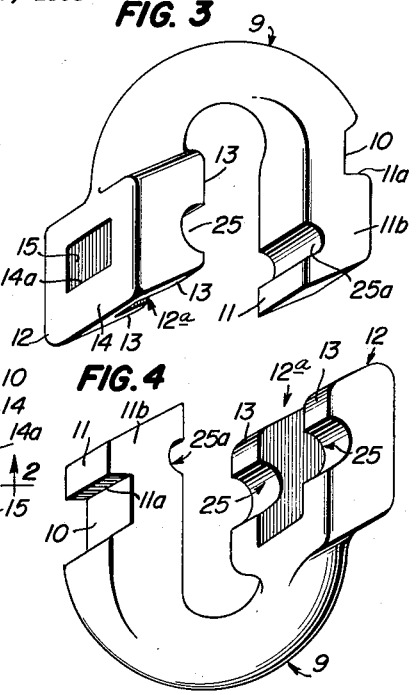
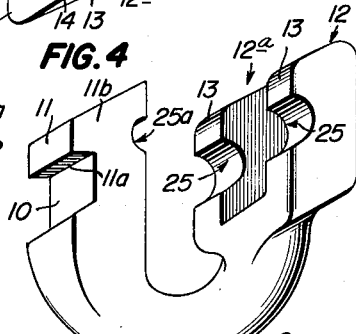
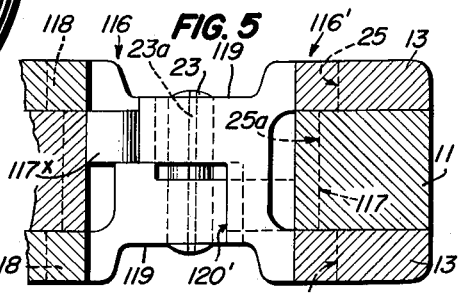
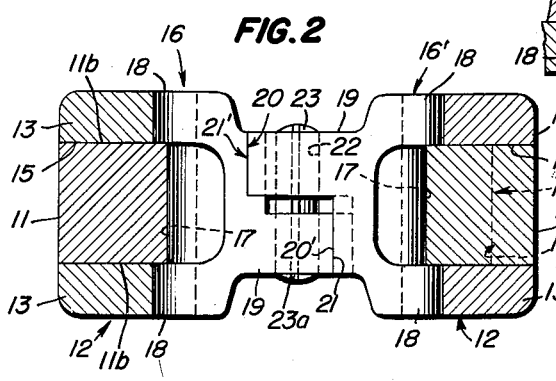
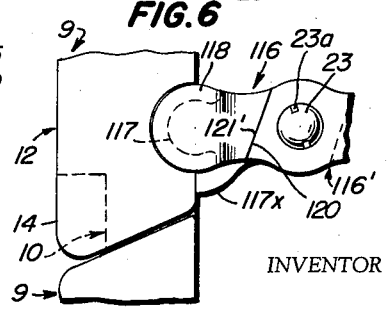
INVENTOR
William K. Robbins
BY Eugene E. Stevens and
Eugene E. Stevens III
ATTORNEYS

United States Patent Office 2,979,886
Patented Apr. 18, 1961

2,979,886
CHAIN LINK HAVING TWO-PIECE SPACING STUD
William K. Robbins, 13453 Moorpark St., Sherman Oaks, Calif.

Filed Jan. 27, 1958, Ser. No. 711,419

9 Claims. (Cl. 59—85)

My invention relates to improvements in chain links or the like, and more particularly to a novel and improved spacer for sustaining opposed link limbs against approach to one another due to the tendency of the link to lengthen under extreme longitudinal loads.

Briefly and generally stated, the invention has for its primary object to provide, in an integral or separable section link or the like, a floating rigid link limb spacer or abutment member which makes rockable bearing contact with opposite link limb portions and which will be an improvement over the similarly functioning spacers of my prior patents, namely, No. 2,525,724, dated October 10, 1950, and No. 2,761,275, dated September 4, 1956.

More specifically, the invention contemplates a two section spacer device, as characterized, which can be heat treated so that all portions thereof will have the same load-sustaining capacity; and wherein each spacer section has a continuous uninterrupted link-limb-engaging bearing at its outer end, each of the said sections providing a load-sustaining shoulder short of its inner end and engaging the load-sustaining inner end of the companion section.

Additionally, it is an object of the invention to provide a spacer as indicated in the preceding paragraph wherein inner portions only of the sections overlap in a depthwise direction; and wherein the interengaging inner spacer section ends and shoulders are so arranged to admit of manual swinging of the sections in opposite directions only, about a link-limb-provided seat and longitudinally of the link when the spacer is not under inward load from its outer ends, but which movement prevented by friction and other means, if need be when the spacer is under such load.

A further object of the invention is to provide a two part spacer wherein load-free means is employed to retain the parts assembled.

Invention also resides in certain novel features of construction, combination and arrangement of the various parts and in modes of operation, as will be understood and appreciated by those versed in the art upon reference to the accompanying drawings in connection with the appended detailed description.

It is to be understood that in accordance with patent statute requirements, the drawings illustrate a now preferred example of the invention, but that the inventive concept involved is susceptible of various other mechanical expressions within the spirit and scope of the subject matter claimed hereinafter.

In the drawings, wherein the same reference characters have been used to designate the same parts wherever they appear in the several views—

Fig. 1 is a top plan view of a separable section link illustrating the application of my novel spacer, parts being shown broken and in section;

Fig. 2 is a cross sectional view taken on the line 2—2 of Fig. 1;

Fig. 3 is a perspective view of one of the link sections;

Fig. 4 is another perspective view of a link section but reversed;

Fig. 5 is a view similar to Fig. 2 but showing a modified spacer structure; and

Fig. 6 is a fragmentary top plan view of the spacer and link of Fig. 5.

Referring to the drawing by reference characters, the illustrated separable section chain link corresponds to that disclosed in my aforementioned patents, and comprises the duplicate sections 9 shown in Figs. 3 and 4 which are assembled in interlocking link-defining relationship by sideward movement, as will be understood from Figs. 1 and 2.

Each link section 9 has one limb end providing a stud 11 while the other limb end terminates in a stud-receiving socket 12. As will be noted from Figs. 2 and 3, each stud 11 is provided by exteriorly cutting away the related limb as indicated at 10, and the sides of each stud 11 are flattened as indicated at 11b. The load-supporting shoulder of each stud 11 is indicated at 11a.

The stud-receiving socket 12 of each link section 9 is open at its free end as indicated at 12a, it being noted that each socket 12 provides the side walls 13 which are connected at their outer edges by the bridge member 14, which latter has the stud end-receiving recess 15, shown in Figs. 1 and 3.

Thus, when the link sections 9 are assembled as in Figs. 1 and 2 by the relative sideward movement heretofore referred to, the load-supporting shoulders 11a of the studs make engagement with the load-supporting shoulders 14a which are provided by the bridge members 14.

The tendency of all chain links is to lengthen under extreme longitudinal load conditions and the side limbs will frequently lengthen different degrees. Consequently, the floating or rockable link-limb-sustaining spacers of my aforementioned patents were devised to prevent the link limbs from approaching one another and although my patented spacers are rendering good service, I find that there is room for improvement.

For instance, in the case of the one piece spacer of the first of my aforementioned patents, it is apt to work loose and separate from the link. When this happens it is due to failure of the link-overlying end heads at opposite ends of one spacer edge, which are formed by riveting after the spacer and link have been assembled. Chains and chain assemblies are subjected to rough treatment in service and otherwise, and there will be times when a spacer will have to withstand a heavy edge blow, which is to say in a dislodging direction transversely of the link. This contingency is met in my present two part spacer 16, 16' by forging-in-position both pairs of link limb-overlying end heads 18, which are shown as constituting the terminals of the outer end bearings 17 of the respective spacer sections 16, 16'.

As to the two part spacers of my other aforementioned patent and pending application wherein superposed spacer sections each make bearing engagement with opposed link limbs, such spacer structures proved unsatisfactory for small sized two part links. This is due to lack of uninterrupted bearing engagement between spacer ends and the seat formed by the engaged studs and sockets such as 11, 12 in my present drawings. No such difficulty is encountered in my present two part spacer 16, 16' as to small sized links because the spacer end bearings 17, 18 make full uninterrupted engagement with the socket and stud provided seats 25, 25a as shown in Fig. 2.

Referring in detail to my present improved spacer, the sections 16, 16' are duplicates except that one is what may be termed a "left hand" section while the other is a "right hand" section in respects that will be presently explained. Each spacer section 16, 16' is of a length less than the distance between the link limb-provided bearings 25, 25a and 25, 25a, but greater than one half of said distance, as will be noted from an inspection of Fig. 2. Outer end spacer section bearings 17, terminating at each end in head enlargements 18, engage the adjacent link-provided bearing 25, 25a as shown in Fig. 2. This view also shows that the inner portions of the sections 16, 16' are stepped as at 19 in a depthwise direction throughout their widths commencing at their bias cut inner ends 21, 21', respectively, to provide the respective bias cut shoulders 20, 20'. It is to be understood that the depth of sections 16, 16', as viewed in Fig. 2, is the distance from top to bottom.

As illustrated when the sections are assembled as in Figs. 1 and 2, the inner ends 21, 21' make contiguous engagement with the respective shoulders 20', 20. The respect in which one of the spacer sections 16, 16' is a "right" and the other a "left" is that while the respective inner ends 21, 21' and shoulders 20, 20' slant across the spacer axis at the same angle, the direction of slant is reversed.

As shown in Fig. 2, the assembled sections 16, 16' are retained in position by a self locking groove pin 23 extending through aligned holes in the steps 19 midway between the link limb-provided bearings 25, 25a and 25, 25a. Means other than groove pin 23 may be used to hold sections 16, 16' assembled, and such pin 23 or substitute is load-free in service as will be presently explained.

It will be understood from an inspection of Fig. 2 that the engagement of section ends 21, 21' with the respective shoulders 20, 20' is such that when pin 23 has been removed the sections 16, 16' can be manually swung in opposite directions only, about the related link bearing 25, 25a as an axis, as indicated by the respective arrows 27, 28 in Fig. 1. However, the abutting end and shoulder surfaces 21, 20' and 21', 20 act as stops to prevent relative movement of said sections in reverse directions; and when pin 23 is in place the spacer 16, 16' becomes a functionally integral unit with pin 23 load-free due to the inward load balancing effect of the engaged end and shoulder surfaces.

It will be understood from Figs. 1 and 2 that the formation of 17, 18 and 25, 25a is such as to seat the spacer sections 16, 16' for swinging movement.

As will be noted the spacer sections 16, 16' are reduced as at 16a in a depthwise direction adjacent the bearing portions 17 and through the length of same to admit of outward swinging so that they can be assembled with and removed from the link.

To assemble the parts the link halves 9 are slid relatively in a sideward direction to the interlocked relationship shown in Fig. 2. Next, the bearing ends 17, 18 of the spacer sections 16, 16' are located in the respective link bearings 25, 25a while the sections are held at opposite acute angles with respect to related link limbs. Now the sections 16, 16' are swung inwardly to the step (19) overlapped position shown in Fig. 2, and pin 23 is driven through holes 22.

Groove pins such as 23 are well known and are characterized by one or more longitudinal grooves coextensive in length with the pin. Tests have demonstrated that a force of 3,000 pounds will be required to force a ⅜" groove pin out of location. However, pin 23, as herein disclosed, is not subjected to any substantial extent to any of the loads to which link sections 9 are subjected. This is so because inward force from opposite ends of spacer 16, 16' is practically entirely absorbed by the pairs of abutting ends and shoulders 21, 20' and 21', 20, even under extreme load conditions. Also to be noted is the fact that the grooves 23a bite into sections 16, 16' are effective to prevent any tendency of sections 16, 16' to pivot relatively about pin 23.

Pins 23 or other fastening means will remain in operative position even when the spacer-incorporating link 9, 9 is subjected to extra hard service at the hook ends of slings, which means contact with sharp corners of castings in foundry work, slab handling, etc.

In practice, the bearing heads 18 of spacer sections 16, 16' will be forged in place and said sections heat treated as an entirety to the same Brinnell hardness as the link sections 9, 9. Thus the spacer 16, 16' will continue to function when the limbs of link 9, 9 lengthen different degrees under extreme loads. Under such conditions it will rock longitudinally slightly in the link bearings 25, 25a and 25, 25a the same as the spacers of my aforementioned patents. But the link 9, 9 would have to be bent all out of shape and the bearing heads 18 sheared off before the spacer 16, 16' could be forced out of assembly with link sections 9, 9.

My present spacer greatly facilitates separable link and spacer assembly in the field as the spacer 16, 16' can be readily installed with simply a hammer and a drift pin, no peening to produce bearing heads 18 being required, nor any riveting.

Figs. 5 and 6 show a slightly modified spacer assembly wherein the units 116 and 116' are identical with 16 and 16', respectively, except in one respect. That difference is that one or both bearing portions 117 which corresponds to 17 in Fig. 2 are provided with a longitudinally coextensive laterally projecting shoulder 117x at one side only. These shoulders 117x, when two are used, are located at opposite sides of the spacer assembly and engage the adjacent back portion of the related stud 11 to prevent turning of 116, 116' in either direction. However, if such a shoulder 117x should be applied to spacer section 116 only, the spacer assembly will be free to rock in the direction of arrow 27 in Fig. 1. It is to be noted that only stud and limb portions 11, 10 tend to lengthen under extreme loads (never socket portions 12), which is why shoulders 117x, when used, are applied to bear against stud portions 11 only. Such shoulders 117x are particularly desirable in very large sized heavy duty links to prevent deformation thereof at the stud and socket-provided joints except under extreme loads that would cause shoulder 117x to yield slightly due to its relatively small stud-engaging surface area.

Incorporation of the shoulders 117x in the sectional abutment member of Figs. 5 and 6 facilitates assembly of the sections 116, 116' by making it easier to align the respective section-provided holes which receive the pin 23. This is so because shoulders 117x admit of manual, or inadvertent, swinging of said sections 116, 116' in one direction only.

Having thus described my invention, what I claim is:

1. In a chain link or the like providing limbs having opposed transverse bearing seats having enlargements at each end, a two section limb-sustaining abutment member, each abutment section providing load-sustaining inner and outer ends and being of a length less than the distance between said link limb-provided seats but greater than one half of said distance, a limb seat-engaging bearing at the outer end of each abutment section and providing laterally enlarged heads at each end engaging in said seat end enlargements, whereby to support said sections for independent swinging movement in the plane of said link, each abutment section providing a transversely apertured depth-reducing step portion coextensive in width therewith and extending inwardly from its inner end and terminating in a transverse load-sustaining shoulder; the step portions of said abutment sections overlapping one another with their apertures aligned and the inner ends of the respective sections in bearing engagement with the shoulder of the other section, stop means provided by the respective engaged inner ends and shoulders of said sections to limit the respective sections to swinging movement in opposite directions longitudinally of and in the plane of the link about the respective link limb-provided seats as axes, and a removable and substantially load free pin means insertable through said aligned step apertures to retain the sections assembled, whereby a functionally integral-in-service abutment structure is provided to sustain the link limbs against approach to one another when the link is subjected to extreme longitudinal loads.

2. The structure of claim 1, and the respective load-supporting inner ends and shoulders of the abutment sections being compensatingly inclined in different directions transversely of said sections whereby to provide said stop means, and through friction and said pin means to prevent section shifting under compression loads.

3. The structure of claim 1, and a link limb engaging shoulder carried by at least one abutment section to resist swing movement of the same in the direction prohibited by said stop means.

4. In a chain link or the like comprising separable parts including interlocked stud and socket-incorporating limb portions at each side providing opposed transverse bearing seats which have arcuate limb socket-provided enlargements at each end, and substantially flat stud-provided surfaces defining the inner ends of said socket-provided enlargements; a two section limb-sustaining abutment member, each abutment section providing load-sustaining inner and outer ends and being of a length less than the distance between said link limb-provided seats but greater than one half of said distance, a limb seat-engaging bearing at the outer end of each abutment section, each of said bearings providing at each end a laterally enlarged flat bottomed head, said heads being seated in the respective seat end enlargements with their flat bottoms engaging the flat stud-provided inner ends of the latter; each abutment section providing a transversely apertured depth-reducing step coextensive in width therewith and extending inwardly from its inner end and terminating in a transverse load-sustaining shoulder; the step portions of said abutment sections overlapping one another with their apertures aligned and with the inner ends of the respective sections in bearing engagement with the shoulder of the other section, stop means provided by the respective engaged inner ends and shoulders of said sections to limit the respective sections to swinging movement in opposite directions longitudinally of the link and in the plane of the latter about the respective link limb-provided seats as axes, a removable and substantially load free pin means insertable through said aligned step apertures to retain the sections assembled, whereby a functionally integral-in-service abutment structure is provided to sustain the link limbs against approach to one another when the link is subject to extreme longitudinal loads, said seat end enlargements cooperating with said bearing heads to swingably support said abutment sections in the movement of same to and from operative position when the abutment member is being assembled or disassembled.

5. In a chain link or the like providing limbs having opposed transverse bearing seats with their long axes extending depthwise, each of said limbs providing a substantially flat surface immediately and completely bordering each seat end and being in a plane substantially normal to said long seat axes, a two section limb-sustaining abutment member, each abutment section providing load sustaining inner and outer ends and being of a length less than the distance between said link limb-provided seats but greater than one half of said distance, a limb seat-engaging bearing at the outer end of each abutment section and coextensive in length with said limb seats, a substantially flat bottomed head at each end of each bearing and engaging the underlying and substantially flat limb-provided surface, whereby to cooperate with the bearings and seats in the support of the sections for independent swinging movement in the assembly of the abutment member with the link, each abutment section providing a transversely apertured depth-reducing step portion coextensive in width therewith and extending inwardly from its inner end and terminating in a transverse load-sustaining shoulder; the step portions of said abutment sections overlapping one another with their apertures aligned and the inner ends of the respective sections in bearing engagement with the shoulder of the other section, stop means provided by the respective engaged inner ends and shoulders of said sections to limit the respective sections to swinging movement in opposite directions longitudinally of and in the plane of the link about the respective link limb-provided seats as axes, and a removable and substantially load free pin means insertable through said aligned step apertures to retain the sections assembled, whereby a functionally integral-in-service abutment structure is provided to sustain the link limbs against approach to one another when the link is subject to extreme longitudinal loads.

6. The structure of claim 5, and the respective load-supporting inner ends and shoulders of the abutment sections being compensatingly inclined in different directions transversely of said sections whereby to provide said stop means, and through friction and said pin means to prevent section shifting under compression loads.

7. The structure of claim 5, and a link limb engaging shoulder carried by at least one abutment section to resist swinging movement of the same in the direction prohibited by said stop means.

8. The structure of claim 5, and the respective load-supporting abutment sections inner ends and shoulders being compensatingly inclined in different directions transversely of said sections whereby to provide said stop means, and through friction and said pin means to prevent section shifting under compression loads, and a link limb engaging shoulder carried by at least one abutment section to resist swinging movement of the same in the direction prohibited by said stop means.

9. The structure of claim 1, and the respective load-supporting abutment section inner ends and shoulders being compensatingly inclined in different directions transversely of said sections whereby to provide said stop means and through friction and the action of said pin to prevent section shifting under compression loads.

References Cited in the file of this patent

UNITED STATES PATENTS

| 2,347,088 | Dock | Apr. 18, 1944 |
| 2,761,275 | Robbins | Sept. 4, 1956 |
| 2,819,586 | St. Pierre | Jan. 14, 1958 |

FOREIGN PATENTS

| 5,598 | Norway | Aug. 2, 1897 |
| 571,185 | Great Britain | Aug. 10, 1945 |